United States Patent [19]

Hofmann

[11] Patent Number: 5,634,384

[45] Date of Patent: Jun. 3, 1997

[54] GEARBOX WITH A BEARING EYE ADJACENT AN ASSEMBLY OPENING

[75] Inventor: Edwin Hofmann, Bad Oldesloe, Germany

[73] Assignee: Getriebebau NORD Schlicht +Kuchenmeister GmbH & Co., Bargteheide, Germany

[21] Appl. No.: 515,984

[22] Filed: Aug. 16, 1995

[30] Foreign Application Priority Data

Aug. 18, 1994 [DE] Germany ............................ 9413344 U

[51] Int. Cl.$^6$ ................................................ F16H 57/02
[52] U.S. Cl. ............................... 74/606 R; 74/421 A
[58] Field of Search ........................... 74/606 R, 421 A; 384/438, 439, 537

[56] References Cited

U.S. PATENT DOCUMENTS

| 2,439,520 | 4/1948 | Miller ................... 74/431 A X |
| 2,441,054 | 5/1948 | Ardussi et al. ........... 74/421 A X |
| 3,350,958 | 11/1967 | Casale ................ 74/606 R X |
| 4,515,038 | 5/1985 | Tsuboi .................. 74/606 R |
| 4,594,911 | 6/1986 | Hofmann ................ 74/606 R |
| 4,774,848 | 10/1988 | Zupancic ............ 74/606 R X |
| 4,932,289 | 6/1990 | Bitcon ................... 74/606 R |
| 5,058,456 | 10/1991 | Manrique et al. ........ 74/606 R |
| 5,295,413 | 3/1994 | Sherman ................ 74/606 R |

FOREIGN PATENT DOCUMENTS

| 1 160 479 | 1/1984 | Canada ............... F16H 57/02 |
| 0 069 215 A1 | 1/1983 | European Pat. Off. ....... F16H 57/02 |
| 0 387 367 A1 | 9/1990 | European Pat. Off. ....... F16H 1/20 |
| 2 664 346 A1 | 1/1992 | France .................. F16H 57/00 |
| 1 679 101 | 9/1991 | U.S.S.R. ................ 384/537 |
| 2 246 412 | 1/1992 | United Kingdom ........... F16H 57/02 |

OTHER PUBLICATIONS

Radicon, David Brown, "Geared Motor Units Get in Line by Offering a Choice," *Design Engineering*, London, GB, Jun. 1993.

*Primary Examiner*—Charles A. Marmor
*Assistant Examiner*—MaryAnn Battista
*Attorney, Agent, or Firm*—Chilton, Alix & Van Kirk

[57] ABSTRACT

Gearbox with a shaft bearing (33) which is accommodated in a bearing eye (7) adjacent to an assembly opening (2), the bearing eye (7) being slotted towards the assembly opening (2). The assembly opening (2) and the bearing (33) are covered by a cap (36). The cap (36) contains a bore (35) for accommodating the major part of the axial extent of the bearing (33). The bearing bore of the bearing eye (7) is, by this means, substantially relieved of the support function and is only used for centring the bearing and the cap, whereas the support of the bearing takes place by means of the cap. The gearbox casing can contain an intermediate wall (8) between the assembly opening (2) and the output-end wall (13) for supporting the output shaft. So as to make it possible to assemble the output-end gearwheel (14) without a special assembly opening, the intermediate wall (8) is lopped at the level of the support (18) of the output shaft. The bearing bore (29) opened by this means is closed by means of a support ring (28) in order to support the bearing (27).

7 Claims, 2 Drawing Sheets

GEARBOX WITH A BEARING EYE ADJACENT AN ASSEMBLY OPENING

BACKGROUND AND SUMMARY OF THE INVENTION

The invention relates to a gearbox with a shaft bearing which is accommodated in a bearing eye adjacent to an assembly opening. For assembly reasons, the bearing eye is slotted towards the assembly opening. A cap is provided which closes the bearing bore and the assembly opening towards the outside. Known examples of this type of gearbox are shown in the German Patent Specifications 591 653 and 41 21 299. The slot in the bearing eye forming the bearing bore has the disadvantage that the bearing is unsupported over a part of its periphery. The intention of the invention is to avoid this disadvantage and permit wider slotting than has previously been possible, taking account of the life of the bearing.

This objective is achieved, according to the invention, by the cap adjacent to the bearing eye containing a bore which accommodates the bearing over the major part of its axial extent. In this arrangement, the bore in the bearing eye is essentially used for centering the bearing and only to a limited extent for supporting it. The bearing is, rather, supported by the bore in the cap. This bore obtains its correct location by being centered by the bearing from the bearing bore of the bearing eye before the cap is bolted to the gearbox casing, so that it can transmit force.

It is, in fact, known (EP-A 69215) to center the cap of an assembly opening not only by arranging the bearing adjacent to the assembly opening in the bearing eye but also by its protruding a little into a corresponding bore in the cap. In the known configuration, however, the bearing only engages sufficiently far in the cap bore for the centering purpose to be achieved. Support of the bearing by the cap is not envisaged and, in the case of a support length limited to the edge region of the bearing, is not possible either because such support is mainly demanded in the central region of the bearing. In the known configuration, the support takes place exclusively in the bearing eye. The invention reverses these relationships by limiting the bearing eye to the centering function and allocating the support function to the cap. Since the bearing is supported by the cap over its complete periphery and the centering function of the bearing eye is not impaired by the slotting, the invention permits the bearing eye to be slotted without impairment and, in fact, over a larger part of the periphery than was previously conceivable.

Assembly problems can also arise where the gearbox casing contains an intermediate wall for supporting the output shaft and possibly further shafts. In this case, it is generally necessary to provide an additional assembly opening for inserting the output wheel in the region between the output-end wall of the gearbox casing and the intermediate wall. The invention avoids this disadvantage by lopping the intermediate wall in the region of the bearing accommodation bore provided for the support of the output shaft and by specifying a certain dimensioning rule for the free width of the casing between the intermediate wall and the casing wall opposite to it. Although this width must have somewhat larger dimensions than those of known gearbox casings, which contain an additional assembly opening, it is a surprising fact that, when this rule is observed, this width can be limited to such an extent that the extra outlay for it is often less than that required for the arrangement of an additional assembly opening. In this arrangement, the edge bounding the intermediate wall extends through the bearing accommodation bore for the support of the output shaft so that this bore is open towards the opposite casing wall and a support element, which supports the bearing in the region of this opening and which can be formed by a support ring, must be provided. In this way, the widening of the free assembly space can take place by raising the casing wall opposite to the intermediate wall by only a small amount. This, however, only applies if the dimensioning rule mentioned above is observed. This rule also takes into consideration the width of the installation space for the output wheel between the intermediate wall and the output-end casing wall. The output wheel can be introduced through the free assembly space created in this way by first inserting it at right angles to its assembly position and then gradually pivoting it into the assembly position with one end surface sliding on the edge of the intermediate wall.

Generally speaking, the upper boundary of the intermediate wall in the direction of the free assembly space will be selected to be as high as possible in order to improve the stiffening of the casing effected by the intermediate wall. The upper edge of the intermediate wall then coincides with the edge over which the output wheel slides while it is being pivoted during assembly. This edge extends over at least that length which corresponds to the end-face diameter of the output wheel.

The extension of the gearbox casing on the side opposite to the intermediate wall can become smaller as the free space between the intermediate wall and the output-end wall of the casing becomes greater. The main interest here is in that region of the inner surface of the output-end casing wall along which the outermost edge of the output wheel slides at a pivoting angle between about 35 and 55 degrees. This is, as a rule, the height region in which the output shaft is located. In order to increase the free space in this region, it is possible to make provision for the inside of the output-end casing wall to have a corresponding recess in the height region of the output shaft. In order to increase the free assembly space, furthermore, the edge of the intermediate wall can be chamfered towards the output end. If the terms "top" and "height" are used in this connection, this is based on the idea that the output shaft extends horizontally, that the intermediate wall is arranged in the region of the gearbox near the bottom and that its upper edge extends approximately horizontally, the opposite casing wall being formed by the top of the casing. It is obvious that the gearbox can also have a different orientation.

BRIEF DESCRIPTION OF THE DRAWINGS

The invention is explained in more detail below with reference to the drawing, which shows advantageous illustrative examples. In the drawing.

DESCRIPTION OF A PREFERRED EMBODIMENT

Figure 1:
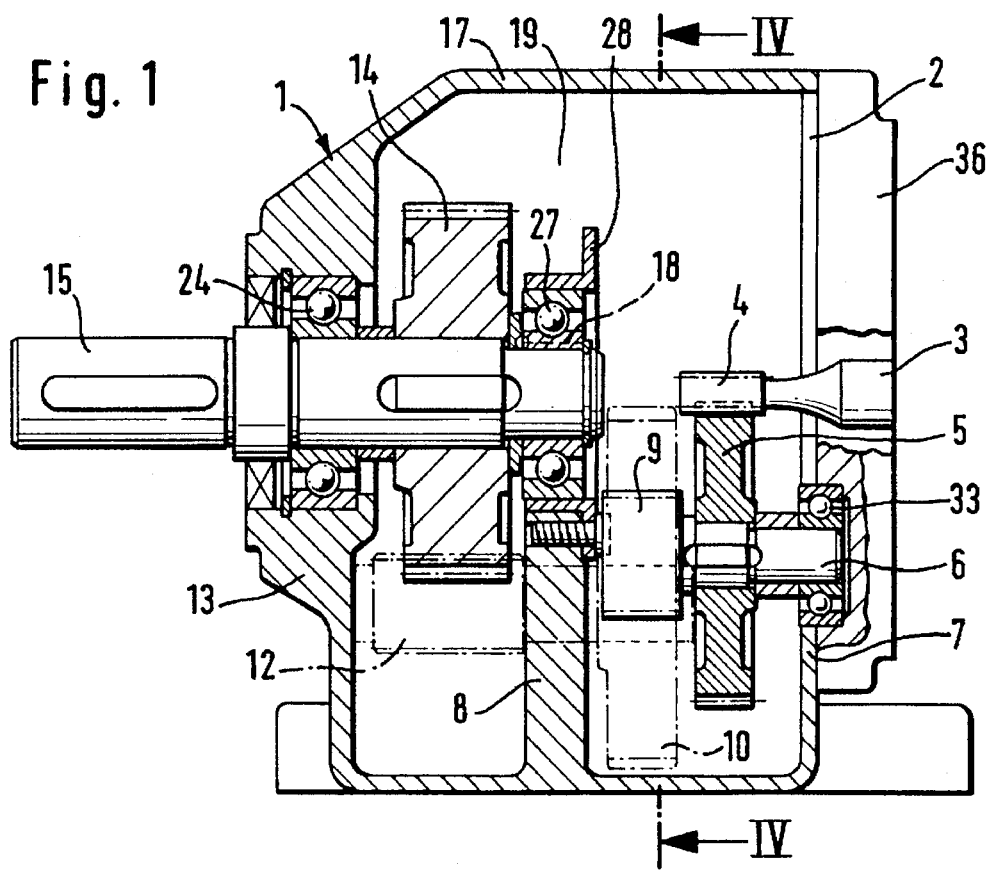
FIG. 1 shows a longitudinal section through a first embodiment.

As shown in FIG. 1, the gearbox includes a casing 1 with an assembly opening 2 on which a cap 36 can be placed.

This cap 36 may, for example, be formed by the flange of a driving motor. The shaft 3, With drive pinion 4, protrudes with cantilevered support from the cap into the gearbox casing 1. The pinion interacts with the spur wheel 5 which is carried by the shaft 6, which is supported, at one end, in a bearing eye 7 protruding into the assembly opening 2 and, at the other end, in an intermediate wall 8 which is configured integrally with the casing 1. The gear motion is transmitted from the pinion 9 of the shaft 6 to a pinion 12 via a spur wheel 10. The pinion 12 interacts with the output wheel 14 which is seated on the output shaft 15 which is supported, at one end, in the intermediate wall 8 and, at the other end, in the output-end wall 13 of the gearbox casing. For the bearing 33, provided near the assembly opening 2, of the shaft 6, a bore is provided in the bearing eye 7 but this bore only accommodates a relatively small part of the axial extent of the bearing 33. The major part of the assembly is located in the bearing bore 35 formed in the cap 36. In order to permit the assembly of fairly large parts through the assembly opening 2 in the case of limited dimensions of the gearbox casing, the bearing eye 7 is cut away, in the direction of the assembly opening 2, in the region 34. In consequence, it no longer completely surrounds the bearing 33.

In order, nevertheless, to permit sufficient support for the bearing 33 the bore 35 in the cap 36 is, according to the invention, made deeper; the major part of the axial extent of the bearing 33, is therefore seated in the bore 35. The bearing eye 7 can be made correspondingly thinner and is mainly used for centering the bearing 33, whereas the support function is taken over by the bore 35, which is in turn centered from the bearing eye 7 by means of the bearing 33 before the cap 36 is bolted to the rest of the casing.

Figure 2:
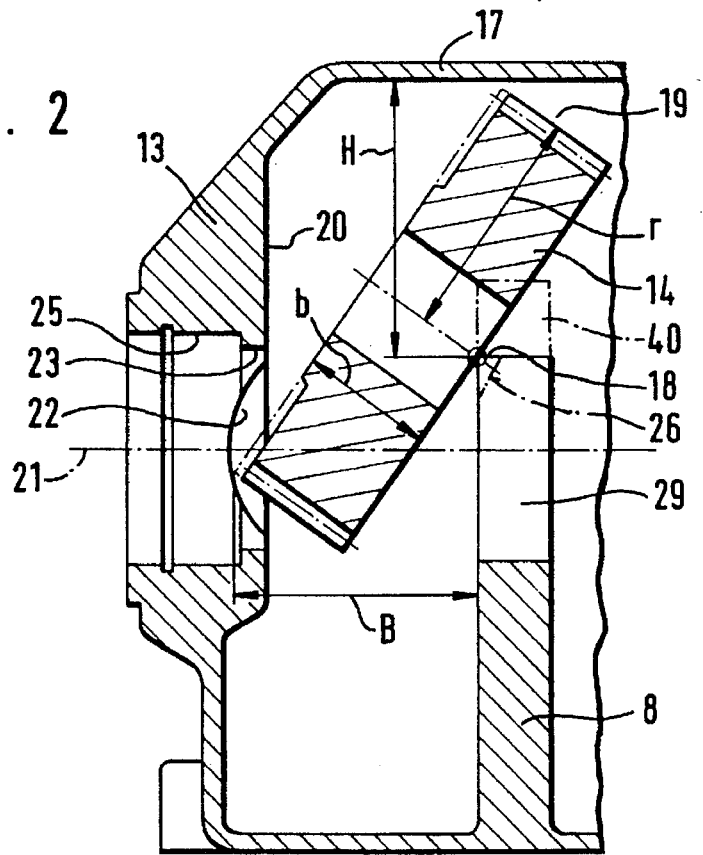
FIG. 2 shows a partial section through the casing during the assembly of the output wheel.

So that the output wheel 14 can be inserted into an installation position between the output-end wall 13 and the intermediate wall 8 of the casing, the intermediate wall 8 is lopped off at the line 18 shown as an interrupted line in FIG. 1. This creates an assembly passage 19 above the line 18. The edge 18 of the intermediate wall 8 is sufficiently low and the casing upper wall 17 opposite to it is sufficiently high for the assembly passage 19 to have adequate height for the assembly of the output wheel 14. This is represented more clearly in FIG. 2 which shows the output wheel 14 in a critical passage position during assembly. It may be seen that the free assembly space for the output wheel 14 is determined by three boundaries namely, firstly, the inner surface of the casing upper wall 17, secondly, the upper edge 18 of the intermediate wall 8 and, thirdly, the inner surface 20 of the output-end casing wall 13. In the critical height region, which is located around the level of the output shaft axis 21, the inner surface 20 can be hollowed out a little, as is shown by the recess 22, in order to create more space for assembly. The recess 22 can extend axially at least over the region of the casing collar 23 which forms the inner boundary for the bore 25 accommodating the rolling contact bearing 24 because the casing collar 23 can remain above and below the hollowed out region. In general, however, the recess 22 can also be extended a little into the region of the bearing bore 25, as is shown in FIG. 2, without the support for the bearing being impaired. In addition, the edge 18 of the intermediate wall 8 can be chamfered off towards the output end, as is indicated in FIG. 2 by the chain-dotted line 26. The distance B between the edge 18 and the inner surface 20 of the output-end wall 13 is increased by the recess 22 and/or the chamfer 26; the height H of the casing upper wall 17 above the edge 18 can be made correspondingly smaller.

For sufficient clearance to be present for the passage of the output wheel 14, the sum of the horizontal distance B between the upper edge 18 of the intermediate wall 8, on the one hand, and the inner surface 20 of the output-end casing wall 13, and the height H between the upper edge 18 of the intermediate wall 8 and the inner surface of the gearbox upper wall 17 should be approximately equal to 1.5 times the sum of the width b and the radius r of the wheel 14.

In order to give sufficient support to the bearing 27, provided in the intermediate wall 8, of the output shaft 15, despite the lopping of the intermediate wall, a support ring 28 is provided. So that this support ring 28 is adequately centred and supported by the part of the bearing bore 29 remaining in the intermediate wall, it is desirable for the upper edge 18 of the intermediate wall 8 to be markedly above the output shaft axis 21 so that the support ring 28 is surrounded by the bearing bore 29 for more than 180 degrees. Although the intermediate wall could conceivably be permitted to end at the level of the output shaft axis or below it, this leads to more complicated requirements with respect to the quality of the fastening and centering of the support ring 28 to the intermediate wall 8 and is therefore not to be generally recommended.

Figure 4:
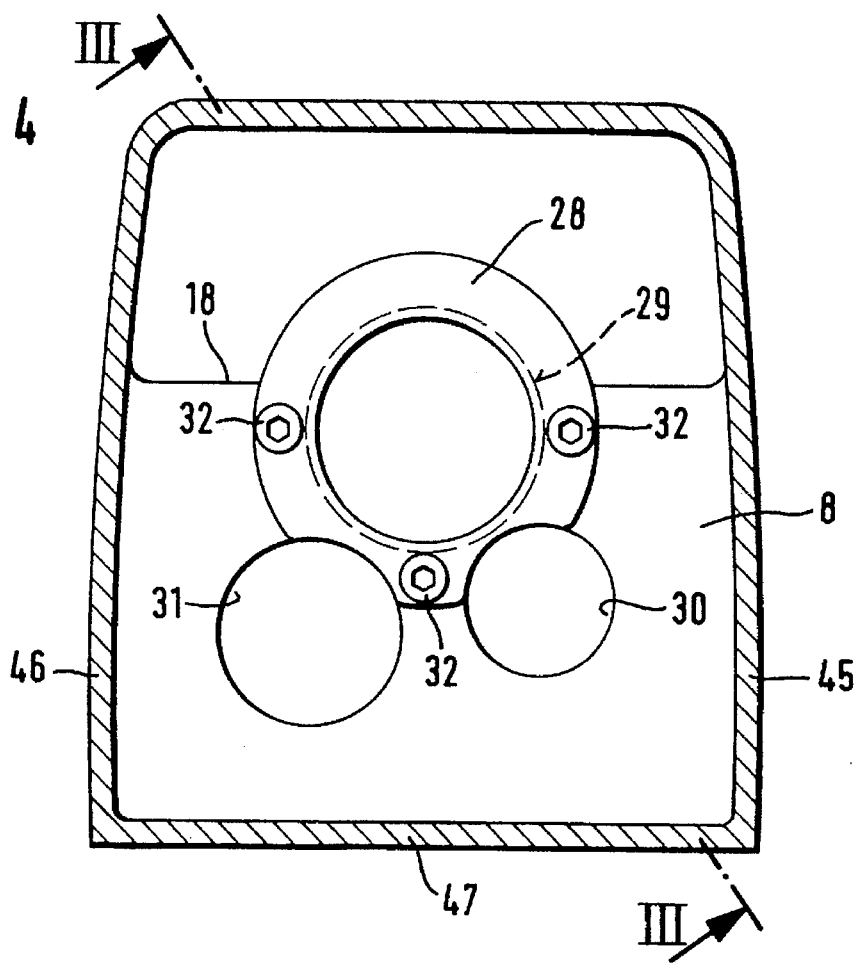
FIG. 4 shows a cross-section through the casing along the line IV—IV in FIG. 1 in the unassembled condition.
Figure 3:
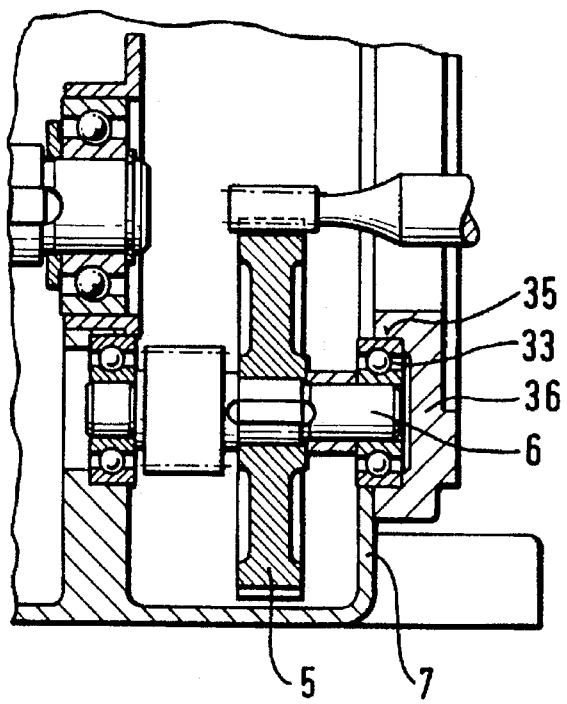
FIG. 3 shows a partial section along the line III—III in FIG. 4.
Figure 5:
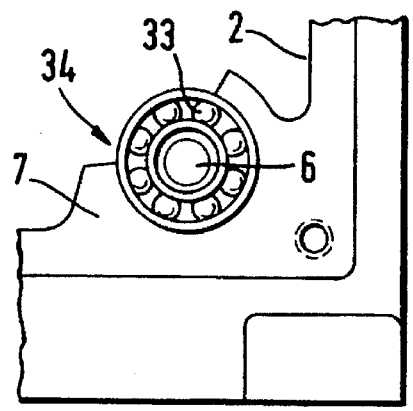
FIG. 5 shows a partial view onto the opening end of the casing.

The support ring has an L-shaped profile. This is desirable because this profile has a high modulus of section and therefore ensures a good supporting effect even if the tubular part of the profile, which determines the diameter of the bearing bore 29 and therefore also indirectly determines the minimum height of the upper edge 18 of the intermediate wall 8, is made thin. The flange part of the ring has, furthermore, the advantage that it permits convenient fastening by means of bolts 32 to the intermediate wall 8. The flange of the support ring 28 is cut away in the region of the bearing bores 30 and 31 provided in the intermediate wall 8 for the further shafts (FIG. 4). This is possible without any sacrifice of strength because sufficient fastening space for the support ring 28 remains between the bearing eyes 30 and 31 and the upper edge 18 of the intermediate wall 8.

The assembly of the output shaft takes place in such a way that the output wheel 14 is first introduced and the output shaft 15 is subsequently pushed in, together with the output-end bearing, from the output end and the bearing 27, with the support ring 28, is finally introduced from the assembly opening end.

I claim:

1. A gearbox having a casing with an assembly opening and a bearing eye immediately adjacent to the assembly opening, the bearing eye being slotted in the direction of the assembly opening at the perimeter of the eye, a cap mounted on the casing and covering the assembly opening and the bearing eye including the slotted perimeter portion thereof and a shaft bearing extending through the bearing eye for centering of the bearing within the eye, the slotted perimeter portion of the eye preventing the eye from completely surrounding the bearing, the cap being provided with a bore positioned in axial alignment with the eye when the cap is mounted on the casing, the bore having a sufficient depth to receive and support the major part of the axial extent of the bearing centered by and extending through the eye.

2. The gearbox of claim 1 including an output wall spaced from the assembly opening, an integral intermediate wall positioned between the assembly opening and the output wall, said intermediate wall defining a plane generally parallel to the output wall and forming an output wheel compartment between the output wall and the intermediate wall and a top wall extending from the output wall generally toward and beyond the plane of the intermediate wall, an output shaft extending between the output wall and the intermediate wall and supporting an output wheel in the output wheel compartment, the intermediate wall having a bearing accommodation bore for receiving the output shaft; the intermediate wall having a terminating edge spaced from the top wall and defining therebetween an output wheel mounting passage, and a bearing support element mounted at the bearing accommodation bore for supporting a bearing on the output shaft, the sum of the width of the output wheel compartment measured parallel to the output shaft between the output wall and the terminating edge and the width of the wheel mounting passage measured between the top wall and the terminating edge being approximately as large as but not substantially larger than one and one-half times the sum of the radius and the width of the output wheel.

3. The gearbox of claim 2 wherein the support element is configured as a support ring.

4. The gearbox of claim 2 wherein the bearing accommodation bore has an arcuate perimeter and is open toward the wheel mounting passage and the terminating edge is positioned adjacent the bearing accommodation bore.

5. The gearbox of claim 2 wherein the terminating edge intersects the bearing accommodation bore.

6. The gearbox of claim 2 wherein a portion of the output wall facing the intermediate wall is provided with a recess facilitating placement of the output wheel in the compartment upon movement of the output wheel through the passage.

7. The gearbox of claim 2 wherein the terminating edge confronting the output wall is chamfered for facilitating placement of the output wheel in the compartment.

* * * * *